Figure 1:
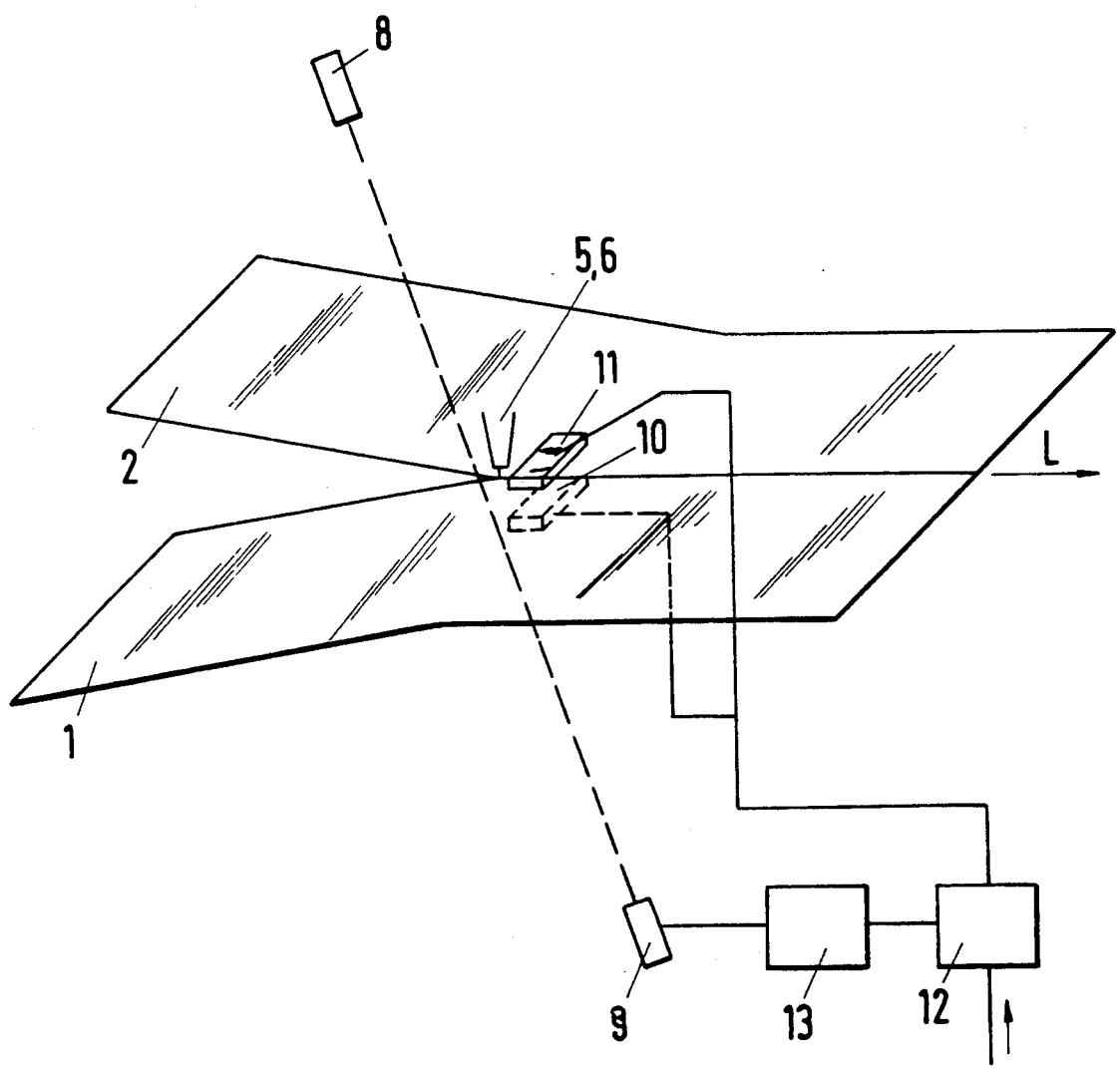

United States Patent
Prange et al.

[11] Patent Number: 5,204,505
[45] Date of Patent: Apr. 20, 1993

[54] PROCESS AND APPARATUS FOR THE CONTINUOUS WELDING OF STRIPS GUIDED IN ABUTMENT BY A LASER BEAM

[75] Inventors: Wilfried Prange, Dinslaken; Joseph Sturm, Duisburg; Hans Schachheim, Hünxe; Heinrich Schmitz, Dinslaken; Manfred Zeimes, Hilden, all of Fed. Rep. of Germany

[73] Assignee: Thyssen Stahl Aktiengesellschaft, Duisburg, Fed. Rep. of Germany

[21] Appl. No.: 668,556

[22] Filed: Mar. 13, 1991

[30] Foreign Application Priority Data

Mar. 29, 1990 [DE] Fed. Rep. of Germany ....... 4010077

[51] Int. Cl.$^5$ .............................................. B23K 26/00
[52] U.S. Cl. ........................... 219/121.63; 219/121.64; 219/121.83; 219/121.84
[58] Field of Search ...................... 219/121.63, 121.64, 219/121.83, 121.84

[56] References Cited

U.S. PATENT DOCUMENTS

| | | | |
|---|---|---|---|
| 3,564,197 | 2/1971 | Bohlen | 219/137 |
| 4,733,815 | 3/1988 | Sturm | 219/121.63 X |
| 4,811,888 | 3/1989 | Ziemek et al. | 228/148 |
| 4,872,940 | 10/1989 | Strum et al. | 156/379.8 |
| 4,945,202 | 7/1990 | Büdenbender | 219/121.63 |

FOREIGN PATENT DOCUMENTS

| | | | |
|---|---|---|---|
| 0215404 | 3/1987 | European Pat. Off. | |
| 0305697 | 3/1989 | European Pat. Off. | 228/222 |
| 0137201 | 8/1979 | Fed. Rep. of Germany | 228/222 |
| 57055 | 5/1977 | Japan | 228/222 |
| 22945 | 6/1977 | Japan | 228/222 |

*Primary Examiner*—C. L. Albritton
*Attorney, Agent, or Firm*—Sprung Horn Kramer & Woods

[57] ABSTRACT

The invention relates to a process and apparatus for the welding of strips 1, 2 without a filler by means of a laser beam 6. To keep the gap width of the joint edges formed by the strips 1, 2 at the joint as small as possible, disposed downstream of the welding focus in the direction L in which the strips 1, 2 run is a cooling device 10, 11, the cooling intensity is controlled to a constant small gap width in dependence on the gap width measured immediately upstream of the welding focus, referred to the direction L.

15 Claims, 4 Drawing Sheets

PROCESS AND APPARATUS FOR THE CONTINUOUS WELDING OF STRIPS GUIDED IN ABUTMENT BY A LASER BEAM

The invention relates to a process for the continuous welding of strips (sheets) guided in abutment without filler by means of a laser beam.

The invention also relates to an apparatus for the continuous welding of strips (sheets) guided in abutment at their joint edges by means of a fixed laser beam, the apparatus having on both sides of the strips to be welded clamping rollers which are disclosed in pairs perpendicularly to the direction in which the strip runs and which form in the zone where the strips abut a gap through which the fixed laser beam impinges on the joint edges to be welded.

Such a process and apparatus are known (German Patent Specification 3723611A1). The enable strips to be welded without filler by means of a laser beam, the joint edges of the strips must be brought as close together as possible so that, taking into account the unavoidable undulation in the joint edges, a maximum gap width of 0.1 mm is obtained.

If the gap width is larger, the material made available by the joint edges is inadequate to fill the gap during welding without the use of a filler.

However, it has been found difficult in practice to keep the gap between the strip joint edges small enough. It was found that the cause of this difficulty was the thermal stresses occurring in the strips during welding. Even though the strips are clamped, these thermal stressings can increase the width of the gap between the rollers.

It is an object of the invention to provide a process and apparatus of the kind specified, wherein the gap between the joint edges of the strips to be welded to one anther can be kept during continuous welding to such a small width that no filler is required for filling the gap.

This problem is solved in the process according to the invention by the features that the strips are cooled in the zone of the weld immediately downstream of the welding focus in the direction in which the strip runs, the cooling intensity being so controlled, in dependence on the width of the gap formed by the joint edges of the strips immediately upstream of the welding focus, referred to the direction, that its width remains within given tolerance values.

The problem is solved by an apparatus according to the invention characterized by a control device having a measuring device, disposed immediately upstream of the welding process in the direction in which the strip runs, for the width, forming the actual value, of the gap formed by the joint edges of the strips, and a cooling device which is disposed downstream of the welding focus in said direction and which acts on the strips in the zone of the weld and whose cooling intensity is adjusted, in dependence on the actual gap width delivered by the measuring device, to obtain a constant gap width lying within given tolerance values.

In the invention the controlled cooling intensity of the strips in the welded zone prevents the joint edges upstream of the welding focus from moving apart due to heavy thermal stresses caused by high temperatures in the welded zone, and from climbing on one another due to excessive cooling in the welded zone. The result of the controlled cooling intensity is that the gap width remains within the tolerance considered permissible for a filler-free welding of the joint edges.

According to a convenient feature of the process according to the invention, the cooling is performed on both sides of the strips. A gaseous medium, more particularly air is a suitable cooling agent. To prevent the blown-on gaseous medium from having a negative effect on the plasma present above the welding focus, according to another feature of the invention the jet of blown-on gaseous medium is directed away from the welding focus. Satisfactory results as regards the control of the cooling intensity of a gaseous medium were achieved by controlling the flow velocity of the medium.

In a first embodiment of the invention the measuring device comprises an emitter disposed on one side of the strip and a radiation receiver disposed on the other side of the strip. A suitable emitter is a laser, a suitable radiation receiver being a diode line camera.

If the cooling device has blowing nozzles for a gaseous cooling medium, in the immediate vicinity of the welding focus their blowing direction should be directed away from the welding focus.

To reach as close to the welding focus as possible, the blowing nozzles can extend by a narrow nose into the gap between the clamping rollers. Outside the gap the strips are conveniently cooled over a larger area. For this reason at this place the blowing nozzles can be constructed in the form of plate-shaped elements. To achieve a high cooling intensity, a convenient feature has been found to be that the plate-shaped elements have flanks which are inclined to both sides. This facilitates the flow-off of the blown-on cooling medium.

Figure 2:
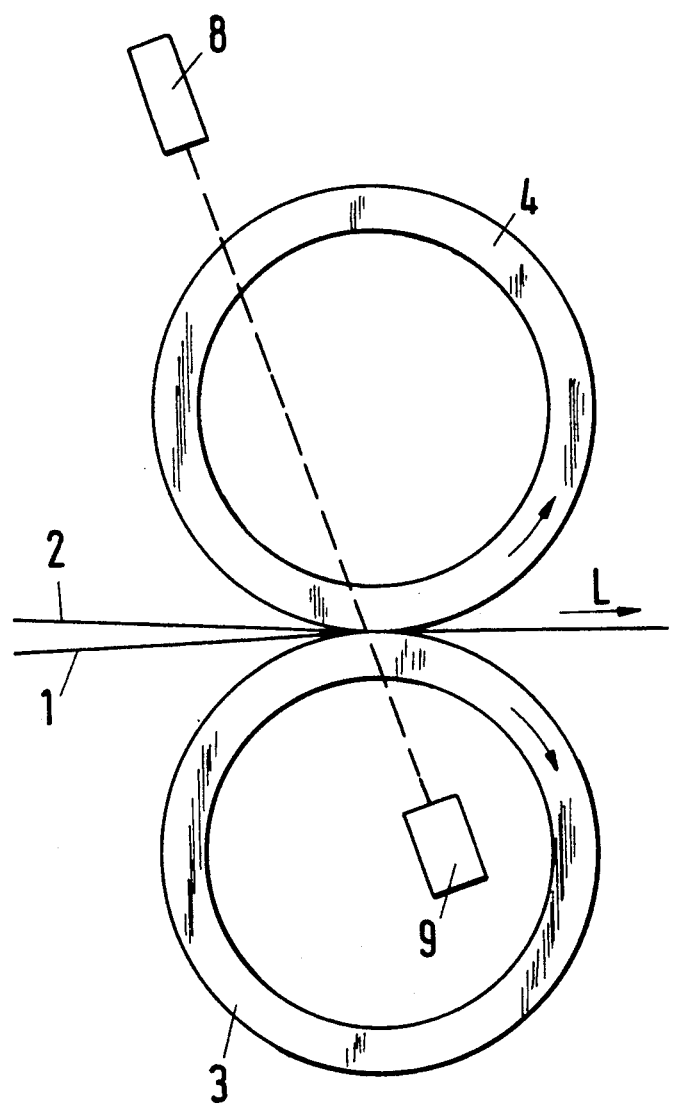
Figure 3:
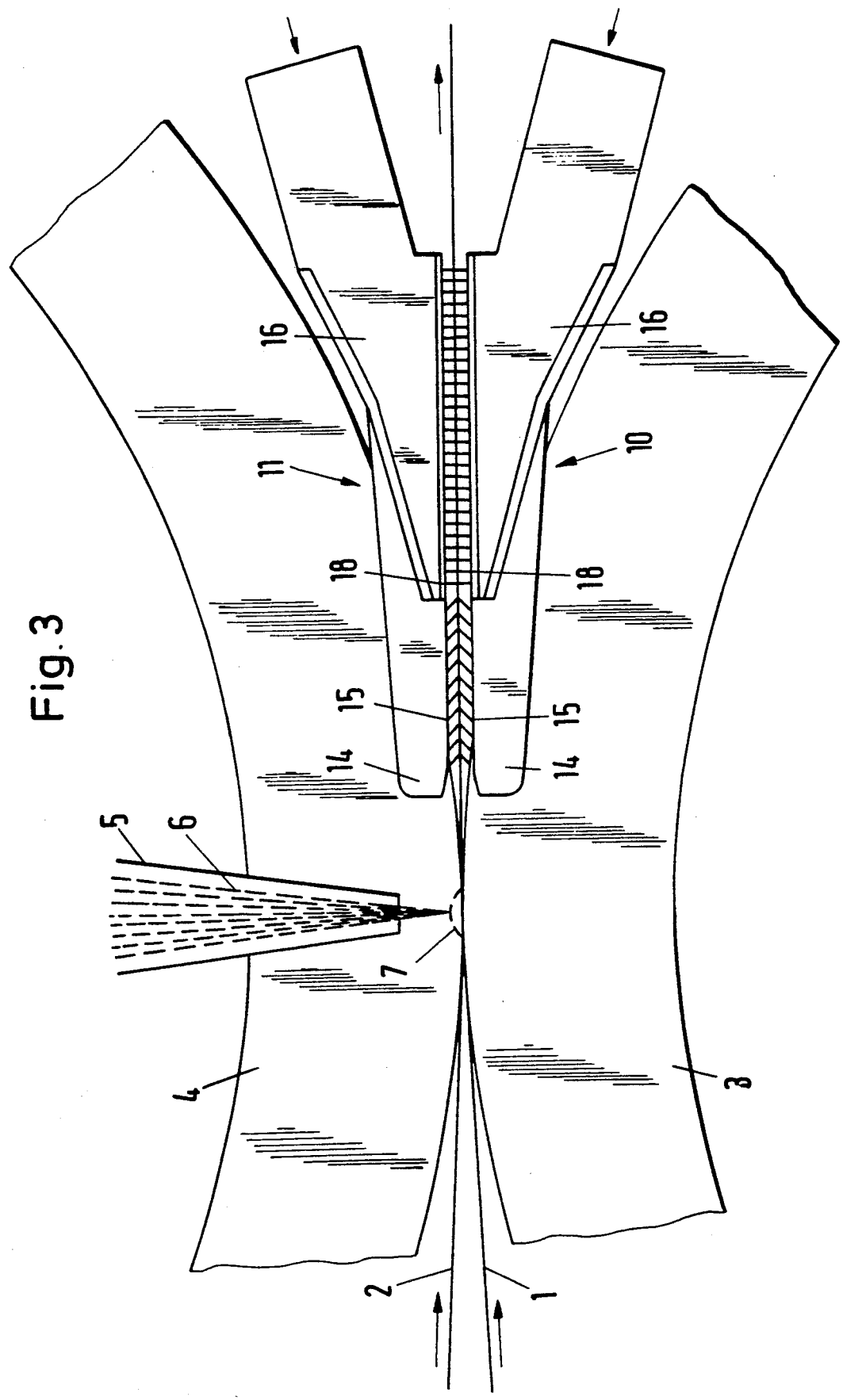
Figure 4:
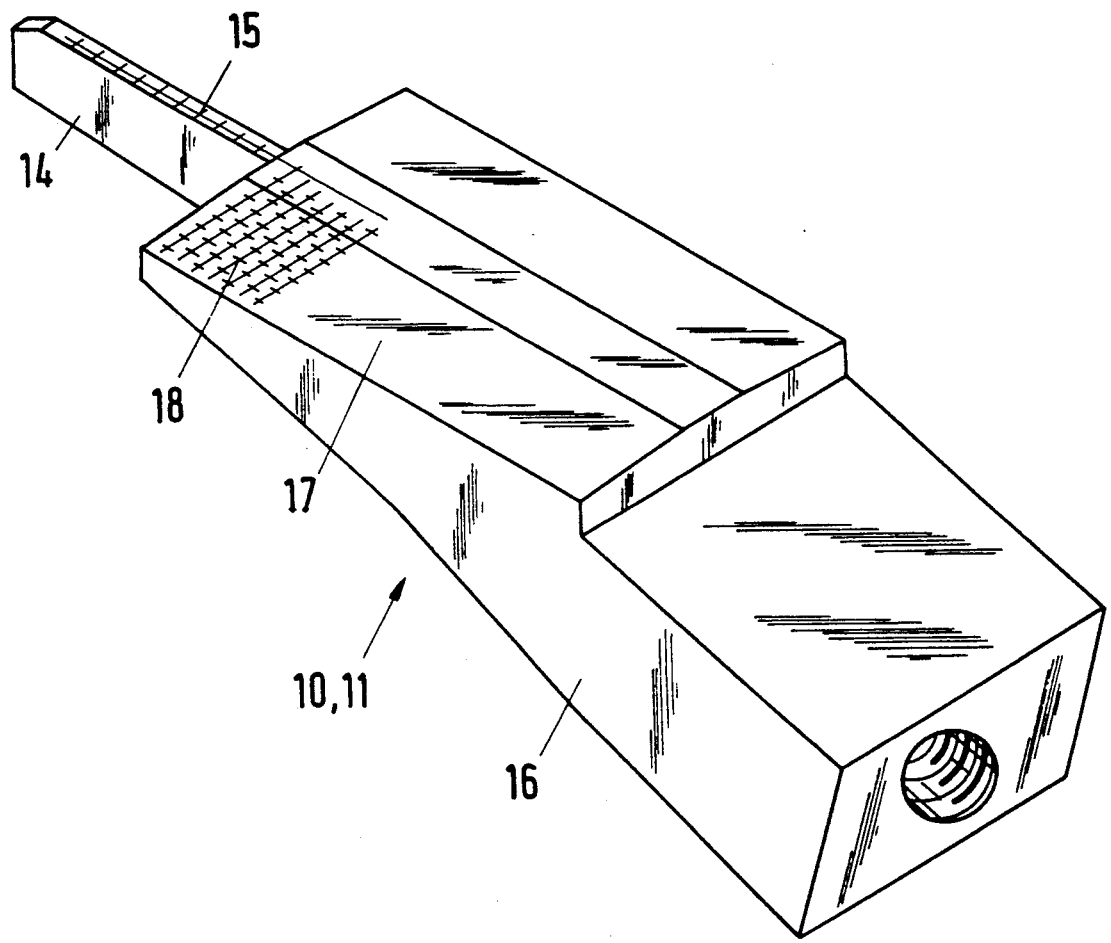

The invention will now be described in greater detail with reference to the drawings, wherein:

FIG. 1 shows diagrammatically an apparatus for the continuous welding of strips, FIG. 2 is a diagrammatic side elevation of an apparatus for the welding of strips, FIG. 3 shows to an enlarged scale a detail of the device illustrated in FIG. 2, and FIG. 4 is an isometric view of a blowing nozzle of the cooling device of the apparatus illustrated in FIG. 3.

An apparatus such as that known from German Patent Specification 3723611A1 can be used for the welding according to the invention of strips guided in abutment. The apparatus has for each of the two strips 1, 2 to be welded to one another a pair of clamping rollers 3, 4, which clamp the strips 1, 2 between themselves and feed the adjoining strips in one plane to the welding place with the smallest possible distance between the joint edges. The adjacent top and bottom clamping rollers 3, 4 are disposed at a small distance from one another. Disposed in the gap of the top clamping roller 4 is a nozzle 5 which delivers a protective gas and through which a focussed laser beam 6 is directed at the joint edges of the strips 1, 2. Above the welding focus of the laser beam 6 a lens-shaped plasma 7 is formed inside which there are such high temperatures that the joint edges of the strips 1, 2 are welded to one another and thereby fill the remaining gap.

As shown in FIGS. 1 and 2, disposed in the direction L in which the strips 1, 2 run is a measuring device for measuring the width of the gap formed by the joint edges of the strips 1, 2. The measuring device consists of an emitter (laser) 8 on one side of the strips 1, 2, and a receiver 9 in the form of a diode line camera disposed on the other side of the strips 1, 2. While the emitter 8 is disposed outside the clamping rollers 4 and its ray is directed through the spaced-out top clamping rollers 4, the radiation receiver 9 is accommodated inside the hollow bottom clamping rollers 3. The distance between the measuring place and the welding focus is less than 1 centimeter.

Disposed above and below the strips 1, 2 downstream of the laser beam 6 in the direction L in which the strips 1, 2 run are cooling devices 10, 11 taking the form of blowing nozzles for a gaseous cooling medium, more particularly cooling air. Air is supplied from a pressure medium source to the blowing nozzles 10, 11 via a valve 12 operated by a computer 13.

In dependence on the actual value of the gap width, which is delivered by the measuring device 8, 9, the computer 13 determines the difference between the required and actual values and operates the valve 12 in accordance therewith, so that by varying the amount of cooling air supplied to the nozzles 10, 11, the cooling intensity on the strips 1, 2 is so controlled that the gap width remains within given tolerance values.

The blowing nozzles 10, 11 shown diagrammatically in FIG. 1 preferably take the form shown in FIG. 4. They consist of a nose 14 formed on the top side with nozzle apertures 15, and a hollow member 16 which adjoins the nose 14 and has disposed on its top side a plate 17 to be inclined to both sides and also formed with nozzle holes 18 as shown in FIG. 3, a blowing nozzle extends by its nose 14 some distance into the gap between the adjacent clamping rollers 3, 4, while the hollow member 16 is disposed outside the gap. FIG. 3 also indicates the direction of the jets directed from the nozzle holes 15, 18 towards the interwelded strips 1, 2. While in the zone of the nose 14 the blown jets are directed at an inclination to the strips 1, 2 and away from the welding place, in the zone of the hollow member 16 they are directed perpendicularly on to the strips 1, 2.

The process and apparatus are of course not limited to the welding of elongate flat material, such as strips, but they also cover the welding of sheets.

We claim:

1. A process for the continuous welding of strips (sheets) (1, 2) guided in abutment without filler by means of a laser beam (6), characterized in that the strips (1, 2) are cooled in the zone of the weld immediately downstream of the welding focus in the direction (L) in which the strip runs, the cooling intensity being so controlled, in dependence on the width of the gap formed by the joint edges of the strips (1, 2) immediately upstream of the welding focus, referred to the direction (L), that its width remains within given tolerance values.

2. A process according to claim 1, characterized in that cooling is performed on both sides of the strips (1, 2).

3. A process according to claim 1, characterized in that the cooling is accomplished by a gaseous cooling medium.

4. A process according to claim 3, characterized in that the gaseous cooling medium comprises a jet of blown-on gaseous medium which is directed away from the welding focus.

5. A process according to claim 4, characterized in that the cooling intensity of the blown-on gaseous medium is controlled via its flow velocity.

6. An apparatus for the continuous welding of strips (sheets) (1, 2) guided in abutment at their joint edges by means of a fixed laser beam (6), the apparatus having on both sides of the strips (1, 2) to be welded clamping rollers (3, 4) which are disclosed in pairs perpendicularly to the direction (L) in which the strip runs and which form in the zone where the strips (1, 2) abut a gap through which the fixed laser beam (6) impinges on the joint edges to be welded, characterized by a control device (12, 13) having a measuring device (8, 9), disposed immediately upstream of the welding process in the direction (L) in which the strip runs, or the width, forming the actual value, of the gap formed by the joint edges of the strips (1, 2), and a cooling device (10, 11) which is disposed downstream of the welding focus in said direction (L) and which acts on the strips (1, 2) in the zone of the weld and whose cooling intensity is adjusted, in dependence on the actual gap width delivered by the measuring device (8, 9), to obtain a constant gap width lying within given tolerance values.

7. An apparatus according to claim 6, characterized in that the measuring device (8, 9) comprises an emitter (8) disposed on one side of the strip and a radiation receiver (9) disposed on the other side of the strip.

8. An apparatus according to claim 7, characterized in that the emitter (8) is a laser.

9. An apparatus according to claim 6, characterized in that the radiation receiver (9) is a diode line camera.

10. An apparatus according to claim 6, characterized in that the cooling device (10, 11) is disposed on both sides of the strips.

11. An apparatus according to claim 10, characterized in that the cooling device (10, 11) has blowing nozzles for a gaseous medium.

12. An apparatus according to claim 11, characterized in that the blowing direction of the blowing nozzles (10, 11) has immediately adjacent the welding focus a jet component directed away from the welding focus.

13. An apparatus according to claim 11, characterized in that the blowing nozzles (10, 11) project by a narrow nose (14) into the gap between the clamping rollers (3, 4).

14. An apparatus according to claim 11, characterized in that outside the gap between the clamping rollers (3, 4), the blowing nozzles (10, 11) take the form of plate-shaped elements (16–18).

15. An apparatus according to claim 14, characterized in that the plate-shaped elements (16–18) have flanks which are inclined to both sides.

* * * * *